Figure 1:
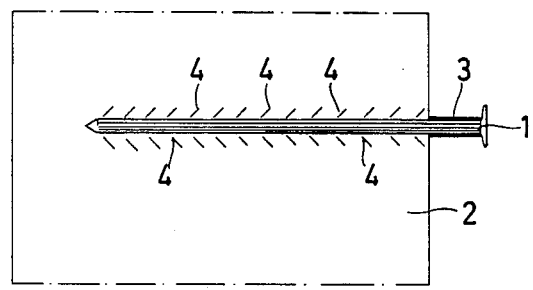

United States Patent [19]

Tengqvist

[11] Patent Number: 4,670,310
[45] Date of Patent: Jun. 2, 1987

[54] METHOD FOR TREATING NAILS

[75] Inventor: Lennart Tengqvist, Stockholm, Sweden

[73] Assignee: Lacani AB, Fagersta, Sweden

[21] Appl. No.: 800,710

[22] Filed: Nov. 22, 1985

[30] Foreign Application Priority Data

Nov. 26, 1984 [SE] Sweden ................................ 8405956

[51] Int. Cl.⁴ .......................... B05D 3/02; B21G 3/26; F16B 15/00
[52] U.S. Cl. ...................................... 427/388.4; 10/34; 10/54; 411/446; 411/903
[58] Field of Search ............................ 10/10 P, 34, 54; 411/82, 258, 446, 902, 903, 914; 427/388.4

[56] References Cited

U.S. PATENT DOCUMENTS 1,829,974 11/1931 Williams .......................... 411/901 X
2,718,485  9/1955 Samuely ............................ 154/126.5
3,814,156  6/1974 Bachmann et al. ................. 151/14.5
4,325,985  4/1982 Wallace ............................ 10/10 P X Primary Examiner—Michael R. Lusignan
Attorney, Agent, or Firm—Nies, Webner, Kurz & Bergert

[57] ABSTRACT

A method for treating a nail in order to increase the withdrawal load required to withdraw the nail from a piece of timber into which it has been driven. In accordance with the invention the nail is coated with a suspension containing a chelating agent so selected that, upon contact with lignin present in the timber the nail is bonded to the lignin via a chelate bond. The chelating agent comprises a modified polysaccharide in aqueous solution and is provided with a protective colloid to which the chelating agent has a lower affinity than to the lignin present in the timber. The suspension also includes a suspended polymeric thermoplastic resin to which the chelating agent has a lower affinity than to the protective colloid.

6 Claims, 2 Drawing Figures

METHOD FOR TREATING NAILS

The present invention relates to a method for treating nails.

The holding power of conventional wood nails, i.e. their resistance to withdrawal, is dependent, inter alia, on their dimensions, and is usually adapted to the connection to be made with the aid of the nail, i.e. the mutual joining of two or more timber pieces.

It is obvious that if nails whose dimensions are sufficiently large to provide the requisite holding power, are used, the timber pieces being joined must have commensurately large dimensions in relation to the nails.

Since the rated holding power of nails often determines their dimensions, it is often necessary when using nails of a desired holding power to construct timber structures from timber of unnecessarily large dimensions with respect to the load which said structures are intended to withstand.

Since timber is expensive, this means that timber structures often become more expensive than would otherwise be the case if the nails used possessed greater holding power in relation to the nail dimensions.

Certain timber constructions, however, shall have predetermined dimensions. Standardized loading pallets intended for the transportation of goods are examples of such constructions. In timber constructions such as these the holding power of the nails used determines the mechanical strength of the construction under certain types of load. Since it is not possible to use timber of larger dimensions than those stipulated, the strength of the construction cannot be increased by using larger nails.

Consequently, there is a need to increase the holding power of wood nails.

The present invention relates to a method for treating nails in a manner which will greatly increase the holding power, i.e. resistance to withdrawal, in comparison with the holding power of conventional nails of the same dimensions.

The term nail as used here and in the following embraces all types of nails, such as headed nails, brads etc..

The present invention accordingly relates to a method for treating nails so as to increase the power required to withdraw a nail from timber into which it has been driven, the method being characterized in that the nail is coated with a suspension containing a chelating agent, so selected as to form a chelate bond with the lignin present in the timber when the nail is driven thereinto, said chelating agent comprising a polysaccharide in aqueous solution and being provided with a protective colloid to which the chelating agent has a lower affinity than to the lignin present in the timber; and in that the suspension has suspended therein a polymeric thermoplastic resin to which the chelating agent has a lower affinity than to the protective colloid; and in that the thus coated nail is then dried.

Figure 2:
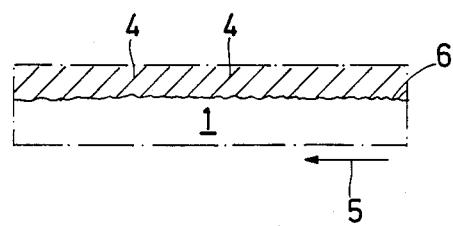

The invention will now be described in more detail, partly with reference to the accompanying explanatory drawing, in which FIG. 1 illustrates a nail which has been driven partially into a piece of timber; and FIG. 2 illustrates schematically and in larger scale the wood-fibers of the timber and the surfaces of a nail driven thereinto.

The present invention is based on the concept of coating a nail with a polysaccharide chelating agent provided with a protective colloid, so as to render the chelating agent inactive prior to using the nail. The protective colloid is chosen so that when the thus coated nail is driven into the timber, the chelating agent will react with the lignin present therein, to form a durable chelate bond therewith. This stiffens the fibres of the wood, and therewith greatly increases the force required to withdraw the nail.

The protective colloid is chosen so that the affinity of the chelating agent thereto is lower than the affinity of the chelating agent to the lignin present in the timber.

In accordance with the invention the nail may be coated with the suspension by spraying or brushing the suspension thereonto, or by immersing the nail into a suspension bath, whereafter the nail is dried.

The suspension includes an aqueous solution of polysaccharide which has been provided with a protective colloid. The polysaccharide used may be a Dextran, sold, inter alia, by Svenska Sockeraktiebolaget, Malmö, Sweden.

The protective colloid is preferably a starch derivative, which according to a preferred embodiment of the invention comprises a cationised starch, preferably corn or maize starch. Maize starch is retailed by the company Stadex AB, Malmö, Sweden.

The suspension also includes a polymeric thermoplastic resin. This may comprise carboxylated styrene-butadiene. Such polymers are retailed by Dow Chemicals Inc., under designation S 670 D. The purpose of the protective colloid is to block the polysaccharide radicals, so as to prevent chelation with other substances with which the surfaces of the nail come into contact during the treatment process, or when being transported and handled. Thus, the protective colloid is chosen so that the polysaccharide has a higher affinity to the protective colloid than to the polymer, and so that said polysaccharide has a higher affinity to the lignin than to the protective colloid.

In order to block all radicals, the mixing ratio between, for example, Dextran and starch derivative shall be about 80% by weight:20% by weight. Dextran and starch derivative are suspended in water in this mixing ratio, to provide a first suspension comprising approximately 50% by volume water and 50% by volume Dextran plus starch derivative. The thus formed first suspension is mixed with a second suspension comprising a polymer and water. The polymer content of the second suspension can be varied. The second suspension, however, shall contain sufficient polymer to build-up a coating of suitable thickness. For example, the second suspension may contain 50% by volume water and 50% by volume polymer.

The two suspensions are mixed together in approximately equal parts by volume, therewith providing a coating suspension which is ready for use.

This latter suspension is applied to the nail in an amount sufficient to provide a coating of about 0.1 mm when the suspension is dried. Naturally, the thickness of the coating can be varied in accordance with the dimensions of the nails treated and with respect to the desired effect.

Although the whole of the nail is preferably coated, with the optional exception of its head, a minor part of the nail may be left untreated.

When the coating has dried, the polymer forms a carrier for the polysaccharide and the protective colloid. As before-mentioned, the polymer used is a polymeric thermoplastic resin. Suitable polymers in the present contect, such as the aforementioned polymer, shall have a melting point such that the polymer is melted by the frictional heat generated when the nail is driven into the timber. In accordance with one preferred embodiment of the invention, this melting point shall lie between 60° C. and 100° C., and may be, for example, approximately 70° C.

The protective colloid is chosen so that it is relatively weakly bound to the polysaccharide, similar to the aforementioned.

When a nail treated in accordance with the invention is driven into a piece of timber, the coating is thus heated to a temperature at which the polymer melts, therewith releasing the polysaccharide provided with the aforesaid protective colloid. The weak bond between the polysaccharide and the protective colloid is then broken and the polysaccharide forms a chelate with the lignin in the timber instead, therewith stiffening the lignin. The polymer then solidifies gradually, as the temperature falls to beneath its melting point.

FIG. 1 illustrates schematically a nail 1 driven into a timber piece 2, the nail being coated with the aforesaid coating, here referenced 3. The thickness of the coating has been exaggerated on the free, exposed part of the nail in FIG. 1. When the nail is driven into the timber 2, the wood fibres 4 thereof are displaced or buckled and orientated at an angle to the direction 5 in which the nail is driven. The position taken by the fibres 4 is illustrated in FIG. 1 with the aid of dash-lines.

As before-mentioned, the lignin is stiffened by being bound to the polysaccharide. Lignin is present both between and in the wood fibres 4. Since the wood fibres are orientated forwardly in the direction 5 in which the nail 1 is driven and the surface 6 of the nail 1 is irregular, shown in larger scale in FIG. 2, the holding power of the nail is greatly increased due to stiffening of the wood fibres, the resistance to withdrawal of the nail being far greater than when the wood fibres have not been stiffened. The polymer solidifying subsequent to driving-in the nail also contributes to fastening the surface of the nail relative to the wood. The contribution made by the polymer in this respect has been measured in a number of tests, and was found to be about 20% of the difference in holding power between non-treated and treated nails respectively, while stiffening of the lignin was responsible for about 80% of this difference. The total difference in holding power is extremely high. For example, when carrying out experiments and practical tests, it was found that the holding power of a conventional nail was doubled when treating the nail in accordance with the present invention.

Doubling of the holding power has a considerable significance in respect of nail connections and joints. For example, it is possible in many cases to use timber of smaller overall dimensions, since the requisite holding power can be obtained with nails which are shorter than conventional, untreated nails. In addition, it is possible to increase the mechanical strength of timber constructions of given dimensions. For example, when testing standard loading pallets (so-called Euro-pallets) nailed with nails according to the invention, it was found that an increase in mechanical strength of more than 100% had been achieved.

A further, important advantage afforded by a nail treated in accordance with the invention is that the nail shows far less tendency to "creep" from the timber as a result of vibrations therein or impacts thereagainst. It has been found experimentally, and in practice, that the maximum holding power, or resistance to withdrawal, of a conventional nail is manifest during the initial withdrawal of the nail, whereafter the holding power of the nail decreases rather rapidly.

The holding power of a nail according to the invention, on the other hand, is substantially proportional to the length of the nail located in the timber, i.e. the length of nail embedment. This means that certain types of timber structures, where only a given, small amount of play can be accepted in the joint or connection, can be used for longer periods of time than when conventional nails are used. The aforesaid loading pallets are examples of such timber constructions.

The present invention can be modified in many ways. For example, the protective colloid may be different to those aforementioned. Furthermore, the thermoplastic resin may also be different to that aforementioned. The aforesaid mixing ratios may also be varied.

The invention is not restricted to the aforedescribed embodiments, since modifications can be made within the scope of the following claims.

I claim:

1. A method for coating a nail and drying said coated nail in order to increase the withdrawal load required to withdraw the nail from a piece of timber into which it has been driven, said coating comprising a suspension including a chelating agent comprising a polysaccharide in aqueous solution with a protective colloid, to which the chelating agent has a lower affinity than to the lignin present in the timber, and further including a suspended thermoplastic resin, to which the chelating agent has a lower affinity than to the protective colloid, said chelating agent being present in an amount sufficient to bind said coated nail to the lignin present in the timber and said resin being present in an amount sufficient to enable the said chelating agent to be retained in said aqueous solution.

2. A method according to claim 1, characterized in that the chelating agent is the compound Dextran.

3. A method according to claim 1, characterized in that said protective colloid consists of a starch derivative, preferably a cationised starch.

4. A method according to claim 1, characterized in that the suspension contains protective colloid in an amount sufficient to block all radicals of the chelating agent.

5. A method according to claim 1, characterized in that said polymer is a carboxylated styrene-butadiene.

6. A method according to claim 1, characterized by selecting a polymer having a melting point in the range of 60° C. to 100° C.

* * * * *